United States Patent [19]

Freudenthal

[11] Patent Number: 4,618,154
[45] Date of Patent: Oct. 21, 1986

[54] ANNULAR LIP TYPE SEALING RING WITH PRE-LOADED LIP PORTIONS

[76] Inventor: Merton L. Freudenthal, P.O. Box 1400, Gretna, La. 70053

[21] Appl. No.: 761,575

[22] Filed: Jul. 31, 1985

[51] Int. Cl.⁴ .................................................. F16J 15/18
[52] U.S. Cl. .................................. 277/205; 277/212 R; 285/111
[58] Field of Search ............... 277/205, 206 R, 206 A, 277/212 R, 212 C; 285/111, 112, 345, 346

[56] References Cited

U.S. PATENT DOCUMENTS

| | | | |
|---|---|---|---|
| 2,634,943 | 4/1953 | Gulick | 277/205 X |
| 3,083,023 | 3/1963 | Creavey | 277/206 R |
| 3,172,670 | 3/1965 | Pras | 277/188 R X |
| 3,653,670 | 4/1972 | Sifri et al. | 277/205 X |
| 3,698,728 | 10/1972 | Walker | 277/206 R X |
| 3,851,888 | 12/1974 | Limpson et al. | 277/206 R |
| 4,057,257 | 11/1977 | Berg | 277/205 X |
| 4,174,846 | 11/1979 | Scott | 277/205 |
| 4,328,972 | 5/1982 | Albertson et al. | 277/205 X |

FOREIGN PATENT DOCUMENTS 356648 10/1961 Switzerland ..................... 277/206 R

*Primary Examiner*—Robert S. Ward
*Attorney, Agent, or Firm*—Pravel, Gambrell, Hewitt & Kimball

[57] ABSTRACT

An annular lip type sealing ring includes an annular body with a generally U-shaped cross-section having a curved heel or base portion in the preferred embodiment and two spaced apart lip portions that define a groove therebetween. The groove terminates at a closed inner end portion near the heel or base and at its opposite end adjacent an open end portion. At least one of the lip portions has respective inwardly and outwardly extending lateral projections. The outwardly extending lateral projection seals against for example a valve shaft, pump plunger or the like. The lip portion has an outer free end with an outer arcuate curved surface. The inwardly extending laterally projecting portion includes an inner curved surface. An elastomer pre-loads the lips with a load that biases the lips to spread apart. The inwardly extending lateral projections conform to and confine the elastomer. The elastomer includes an elastomeric annular ring having a generally round cross-section before insertion into the groove and a diameter greater than the width of the groove so that the elastomeric ring assumes the generally oblong or obround shape of the groove during use and thus pre-loads the lips as it attempts to regain its original shape.

16 Claims, 22 Drawing Figures

ANNULAR LIP TYPE SEALING RING WITH PRE-LOADED LIP PORTIONS

BACKGROUND OF THE INVENTION

The present invention relates generally to the field of machinery seals or machinery packing and more particular annular fluid sealing members and more specifically improvements to the "U-type" composite packing ring seal.

Annular ring type seals are commonly used in the industry for sealing various applications such as valve stems, gas lift valves and the like. These seals can be used in either a static or dynamic situation for the prevention of leaking between parts. U-type seals are generally a composite construction including an outer U-shaped body with an inner flexible or pliable member which occupies the inside of the U. The sides of the U are referred to as lips. U-type seals are typically assembled with an interference and are force fit with dimensions between the sealing lips being important especially when dealing with joint packing applications of high pressure or where one part moves with respect to the other, such as for example in the application of a high pressure valve. In that regard, the valve stem would be the part surrounded by the annular U-type seal. The interference or force type fit of the sealing lips provides for a good seal against the valve stem for example, and the seal itself allows the stem to turn with respect to the other parts of the valve such as the valve body. This is of course is only exemplary of the uses of such annular U-type seal rings.

U-type seals are found in the prior art. Seals of this general type can be seen for example in U.S. Pat. No. 4,174,846 entitled "Sealing Ring" and issued to Lynn Scott. Various other U-type seals have been patented including for example, U.S. Pat. No. 3,342,500 issued to Knudson, U.S. Pat. No. 3,653,672 issued to Felt, U.S. Pat. No. 4,328,972 issued to Albertson, et al. and U.S. Pat. No. 3,851,888 issued to Limpson. These are exemplary of this type of annular seal. A discussion of various other seals which are pertinent to the present invention follows herein.

U.S. Pat. No. 4,428,590 issued on Jan. 31, 1984 to Aaron J. Pippert and H. T. Miser entitled "Anti-Extrosion Sealing Device With Hinge-Like Bridge Section" discloses a seal and method of making same wherein a first body is formed with a plurality of parallel, spaced apart bores therethrough. A second body is molded onto the first body so that it fills the bores and forms enlarged portions adjacent the ends of the bores, whereby the two bodies are permanently mechanically interlocked. The Pippert, et al. device differs from the present invention because of the difficulty of manufacturing the elastomer portion of the device. The present invention uses a simple O-ring elastomer which pre-loads the lips of a U-cup body.

U.S. Pat. No. 4,328,972 issued on May 11, 1982 to Kenneth R. Albertson and Ralph Peterson entitled "Seal Ring and Method of Manufacture" is a sealing ring having a U-shaped shell member and an actuator member formed in situ from liquid elastomer. The shell member has a base portion with two legs extending from the base to form a cavity therebetween which is filled with a liquid elastomer and cured in situ. This device thus has an elastomer that is cured in place unlike the present invention which uses a pre-cured, pre-formed elastomer to pre-load the lips.

U.S. Pat. No. 4,232,873 issued on Nov. 11, 1980 to Jules M. Hock entitled "Ring Spring For Composite Machinery Seals and Method of Manufacturing Same" reveals an elastomeric resilient ring spring for use in an annular elastomeric boot generally of a U-cup configuration having an exposed annular groove which is generally x-shaped, the ring spring being generally +-shaped including four lobes, first and second opposed lobes extending parallel to the plane of the ring spring and third and fourth opposed lobes extending perpendicular to the plane of the ring spring. The dimensions of the ring spring are approximately the same as those of the groove whereby rotation of the ring spring about its ring axis through an angle of 45° permits mating of the ring spring into the groove in the boot.

Dennis H. Iverson issued U.S. Pat. No. 4,193,606 on Mar. 18, 1980 entitled "Machinery Seal" illustrates a U-cup type machinery seal for circumferential placement about a rotating and/or reciprocating member. The seal includes a boot having a generally triangular cross-section in the groove for biasing radially positioned lips into sealing engagement with the machinery to be sealed. The triangular cross section of the groove differs from the oblong groove of the present invention that is occupied by an expander of greater diameter than the width of the groove to pre-load the lips of the seal body.

U.S. Pat. No. 4,174,846 entitled "Sealing Ring" issued to Lynn S. Scott on Nov. 20, 1979 communicates an annular sealing ring comprises a U-cup having a pair of lips for forming a cavity therebetween and elastomeric expander ring mounted within the cavity. Sealing edges on the lips are contacted by members to be sealed and are positioned on the outside of the lips at a vertical location at or below the horizontal center line of the expander ring is mounted within the cavity. The Scott U.S. Pat. No. 4,174,846 patent uses an outer surface of the lips which is squared rather than the round expander end portion of the present invention in combination with rounded lips. With the present invention, this provides a generally rounded surface to one end of the seal which makes the seal easier to install in a cavity. Unless seal alignment is very close, in fact, installation is difficult on the Scott type seal.

Lynn S. Scott also was issued U.S. Pat. No. 4,013,299 entitled "Sealing Ring" on Mar. 22, 1977 dealing with an annular sealing ring that comprises a U-cup having a pair of lips for forming a cavity therebetween and an elastomeric expander ring mounted within the cavity. Sealing edges on the lips are contacted by members to be sealed and are positioned on the outside of the lips at a vertical location at or below the horizontal center line of the expander ring when the expander ring is mounted within the cavity. The Scott U.S. Pat. No. 4,013,299 patent does not provide for lip loading in the area of the O-ring. Further, the heel or base portion configuration does not allow loading directly on an expander with the configuration shown.

On May 27, 1975, U.S. Pat. No. 3,885,801 entitled "Packing" was issued to John B. Scannell. The Scannell U.S. Pat. No. 3,885,801 patent discloses a sealing assembly for sealing in two directions, comprising an elastomeric seal ring with a pair of lips, a solid elastomeric loading ring between the lips, and a pressure inverting pedestal ring active on the loading ring such that when fluid pressure is behind the pedestal ring the fluid pressure bypasses the pedestal ring and acts on the loading ring to deform the same to press the lips into sealing engagement with the members, and when fluid pressure is behind the seal ring the latter pushes the loading ring against the pedestal ring to likewise cause the loading ring to deform and press the lips into sealing engagement with the members.

The Scannell patent uses an end portion which is not rounded as is the case with the present invention, but rather shows a squared configuration which is difficult to install and which requires a mating surface having multiple curves as shown in FIGS. 4 and 5 of the drawing.

Alma A. Limpson, Jr., et al. was issued U.S. Pat. No. 3,851,888 on Dec. 4, 1974 entitled "Machinery Seal", which teaches that a U-cup type of machinery seal adapted to be disposed in an annular configuration about moving member such as a rotating or reciprocating shaft, or a reciprocating piston, and includes an annular groove adapted to receive an elastomeric spring to bias the seal, said annular groove defining a pair of axially extending leg portions and a base portion joining said leg portions, the width of the base being less than the width of the machinery portion within which it is to be restrained, each of said leg portions having end surfaces which are sloped with respect to the side surfaces of said base portion to provide tips which extend radially inwardly and outwardly, respectively with a total radial width between the tips which is greater than the radial width of the machinery confinement in which the seal is to be constrained. The annular groove has a transverse cross-section similar to the four-lobed, substantially flattened X-shaped cross-section of the elastomeric ring spring, the minimum internal radial cross-sectional width of said annular groove being located at least as close to the axially outward opening of said groove as said radially extending tips are, thereby to apply mechanical wedging and hydrostatic pressure from said ring seal directly to said tips. The base surface of said being substantially planar permits multiple usage thereof in a stacked configuration or in single usage, without altering the seal characteristics of the said base surface.

On Nov. 19, 1974, Charles L. Tanner was issued U.S. Pat. No. 3,848,880 for "Fluid Seal" disclosing herein is a fluid pressure seal useful over a wide range of fluid pressures. The seal is adapted for use between two either relatively moving or static members one of which has an annular sealing groove formed in the surface thereof adjacent the other member. A continuous annular boot fabricated from a relatively hard material and of generally U shape in cross section is positionable in the sealing groove with its body portion adjacent the low pressure side of the groove and a pair of generally parallel spaced leg portions positionable respectively adjacent the base of the groove and the other member with little or no initial interference. A second coaxial continuous annular ring fabricated from a resilient flowable material, such as rubber, has a first body portion positioned between the legs of the boot and a second body portion extending beyond the boot legs in the high fluid pressure direction. The second body portion has a width dimension in its free state greater than the distance between the boot legs and is adapted to be in a state of compression after installation in the sealing groove to effect a seal at low fluid pressure.

Maurice F. Felt, was issued U.S. Pat. No. 3,653,672 on Apr. 4, 1972 entitled "Seal Ring" which teaches a seal ring is provided having rounded lips wherein the top point of sealing is below the top of the ring and the ring has a large area in contact with the sealing surface. The seal ring may have a hollow center portion or a filter strip may be employed in the center of the ring. The filter strip, if used, is of rectangular configuration.

U.S. Pat. No. 3,342,500 issued on Sept. 19, 1967 to C. B. Knudson for "Packing Construction" relates to machinery packing, and more particularly to the new and improved composite packing ring structure for effective hydrostatic loading of the packing may be accomplished so that stresses, element distortions and other deleterious features are eliminated in the packing when the same is loaded in the machinery for which it is intended. A further object was to provide an composite O-ring packing ring member wherein suitable relief area is provided the O-ring in such a manner that distortion or cutting into the O-ring by the packing ring member is least likely to take place. Also to provide annular relief areas in the packing ring member of a snap-seated composite packing ring construction wherein suitable relief ares are provided for O-ring expansion when the packing ring is disposed under pressure; and also to provide a composite packing construction which is self-loading type having suitable means for accommodating distortion in the packing ring when the same is installed and loaded in the machinery. It is an overall composite of various types of composite rings for relief of interference in its fit.

U.S. Pat. No. 3,279,805 issued on Oct. 18, 1966 to Henry J. Quinson entitled "Sealing Joint" teaches of sealings joints composed of two rings or washers arranged concentrically, their respective diameters being such that a spaces exists between the two rings, this space being filled out with a packing made of rubber or of a similar material which is in intimate contact with the corresponding faces of the rings, the height of said packing being slightly greater than that of the rings so that the packing overlaps each place surface of the rings.

Maurice D. Felt was also issued a U.S. Pat. No. 3,169,776 on Feb. 16, 1965 for "Multiple Purpose Self-Loading Machinery Packing" disclosing packing rings for machinery to effect sealing and, more particularly, to a ne and improved packing structure which can be used in U-cup and V-packing contexts to great advantage both in sealing performance qualities obtained and in reduction in manufacturing costs. It is primarily intended for use in packing rings, piston rings and gland structures in industrial equipment such pumps and compressors.

U.S. Pat. No. 3,132,869 issued on May 12, 1964 to Rodney R. Campbell, Assignor and Malcolm R. Mahen, Trustee entitled "Fluid Pressure Responsive Seal Assembly" illustrating annular fluid seals interposed between relatively movable members having a clearance therebetween and in which there may be at times substantial fluid pressure differential across the seal. It is particularly useful when employed in a fluid valve adapted to open and close a fluid line carrying high pressures.

On Aug. 28, 1956, U.S. Pat. No. 2,760,794 was issued to William Hartranft for "Vibration Rings For Mechanical Seals" divulging improvements in rings which are sometimes called "vibration rings" employed to resiliently support an abutment ring which is employed with or as a part of a mechanical sealing device for sealing a space between a shaft and a machine-casing opening through which the shaft extends.

The above discussed prior art U-cup type machinery seals with elastomeric expanders generally are force fit into a packing gland with the amount of interference between the gland width and the seal lips being 15% to 25% of the gland width. This high interference of the seal lips causes difficulty when forcing the seal into the packing gland. The present invention provides a design that can utilize a lessor interference fit between the gland width and the seal lips of 7% to 12% which provides an effective seal at high and low pressures and is easier to force into the packing gland. Further, the U-cup type seals with elastomeric expanders of the prior art usually have a beveled or square outer free end that is difficult to force into the seal gland. The present invention utilizes an outer arcuate curved surface that is easier to force into the packing gland. Further, U-cup type seals in the prior art usually have a heel or base portion that is squared or square with an arcuate concave surface. When these prior art seal configurations are used in a stacked configuration the upper seal packing ring loads directly upon the lower packing ring without interaction on the expander. The present invention utilizes an arcuate curved heel (or base portion) that interacts directly upon the expander which causes an inward and an outward force on the lateral projections which results in a more effective seal.

Typical uses of the seal of the present invention are, for example, valve stem packing, gas lift valve packing, pump down plug packing, chemical injection valve packing, plunger pump packing, swivel joint packing, well head lubricator packing, hydraulic cylinder piston and rod packing, back pressure valve packing, downhole safety valve packing, well head tubing hanger packing, and intensifier packing.

DETAILED DESCRIPTION OF THE PREFERRED EMBODIMENT

Figure 1:
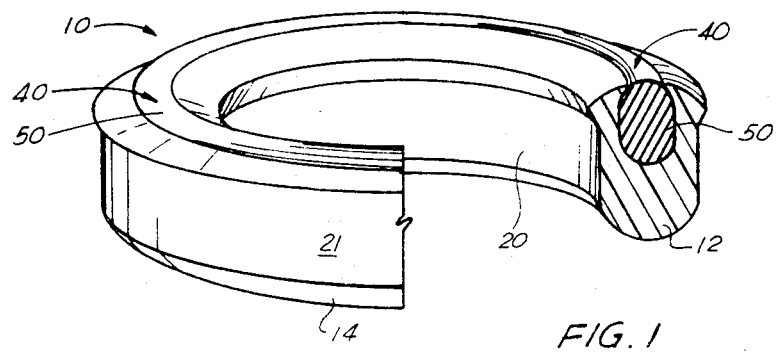
FIG. 1 is a perspective, cutaway view of the preferred embodiment of the apparatus of the present invention.
Figures 2, 2A, 3:
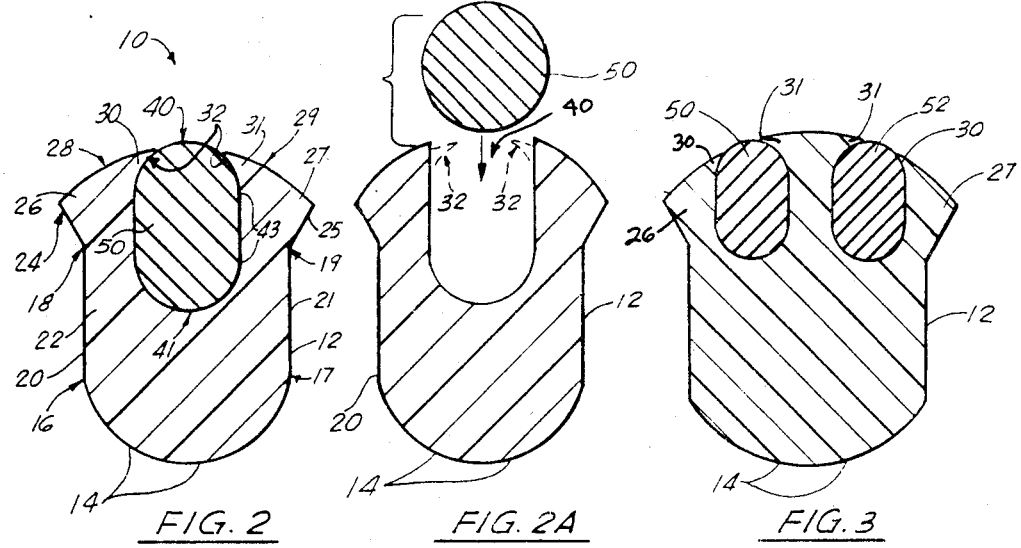
FIGS. 2, and 2A are sectional views of the preferred embodiment of the apparatus of the present invention.
FIG. 3 is a sectional view of an alternate embodiment of the apparatus of the present invention.

FIGS. 1, 2 and 2A best illustrate the preferred embodiment of the apparatus of the present invention designated by the numeral 10.

Figure 10:
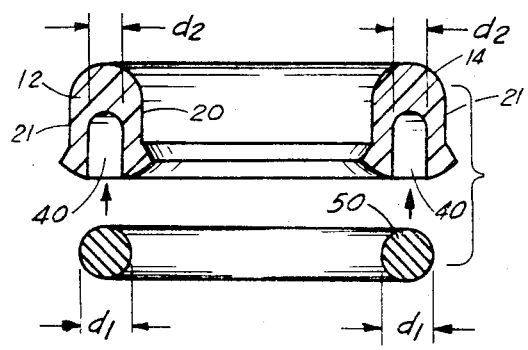
Figure 11:
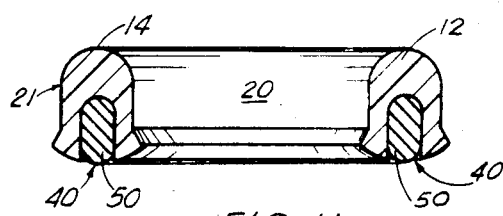

Annular seal 10 includes a general U-shape body 12 having a generally curved heel portion 14 which terminates with the intersection of heel 14 and side walls 20, 21. The intersection of heel 14 with side walls 20 and 21 is indicated by the numerals 16, 17 respectively in FIG. 2. Each side wall 20, 21 terminates at positions 18, 19 which define the beginning of laterally extending projections 26, 27. Each laterally extending projection 26, 27 is defined by outwardly extending surfaces 24, 25 which are generally planar in section and curved surfaces 28, 29 which are arcuate or curved in section. A annular groove 40 of body 12 is provided between a pair of spaced apart lips 22, 23, each lip having a inwardly projecting lateral portion 30, 31 with an internal curved surface 32 that confines and contains an elastomeric expander ring 50 within the groove 40. The cross-section of groove 40 includes a semi-circular, closed end portion 41, as well as a generally rectangular central portion 43. The upper portion of groove 40 is defined by the inner curved surfaces 32 of projections 30, 31. During operation, the groove 40 has an overall oblong or oval shape as shown best in FIGS. 1 and 2. Groove 40 is occupied during operation by elastomeric resilient expander ring 50 which is normally round in cross section (see FIG. 10). Expander 50 can be made of for example Nitrile, Viton, silicon, Fluoro-silicon, and Aflas, for example or such like material having a "memory" so that it returns substantially to its original shape when deformed. Elastomeric expander 50 is annular and of uniform cross-section having a diameter D-1 which is preferably larger than the width D-2 of groove 40 (see FIG. 10). In the preferred embodiment, D-1 is for example 10–25% larger than D-2. Thus, when elastomeric expander 50 occupies groove 40 (see FIG. 11) it is deformed to the oblong configuration of groove 40 as shown in FIG. 11 of the drawings. Because of the original rounded configuration (as shown in FIG. 10), elastomeric expander 50 attempts to obtain its original shape when confined in groove 40. This is due to the "memory" characteristics of its chosen material as enumerated above. The expander pre-loads the lips 22, 23 thus, biasing them apart to enhance the sealing characteristics of the annular seal ring 10. In FIG. 2, a single expander 50 is shown while FIG. 3 illustrates an alternate embodiment which uses two expanders 50, 52. Each expander 50, 52 is confined during manufacture (FIGS. 9–12B) on two sides from escaping groove 40 by projections 30, 31.

Figure 4:
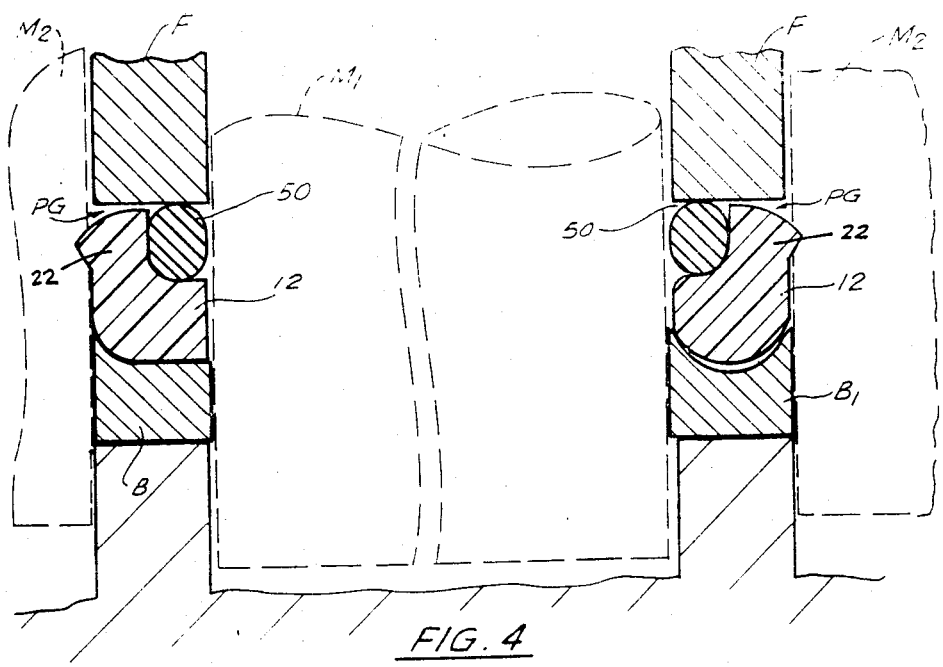
FIG. 4 is a schematic illustration of another embodiment of the apparatus of the present invention shown in use.

In FIG. 4, the annular seal 10 is positioned about a member $M_1$ to be sealed which can either a fixed or moving member. A housing or second member $M_2$ surrounds seal 10. The member $M_2$ can be a moving member. The seal 10 is disposed between follower F and backup B within packing gland PG. In the alternate embodiment of FIG. 4, a single expander 50 is used with the body 12 only having a single lip. In the embodiment of FIG. 4, the expander 50 is confined on one side by the single lip 22 shown, and on the other side by a member $M_1$ which for purposes of illustration in FIG. 4, backup B and body 12 are shown in two variant heel configurations. The left hand side of FIG. 4 shows a body 12 with a heel that is partially round while the right hand side of FIG. 4 shows a backup "B" that is rounded arc semi-circular. Body 12 and backup B could be made with either heel confirguration.

Figure 5:
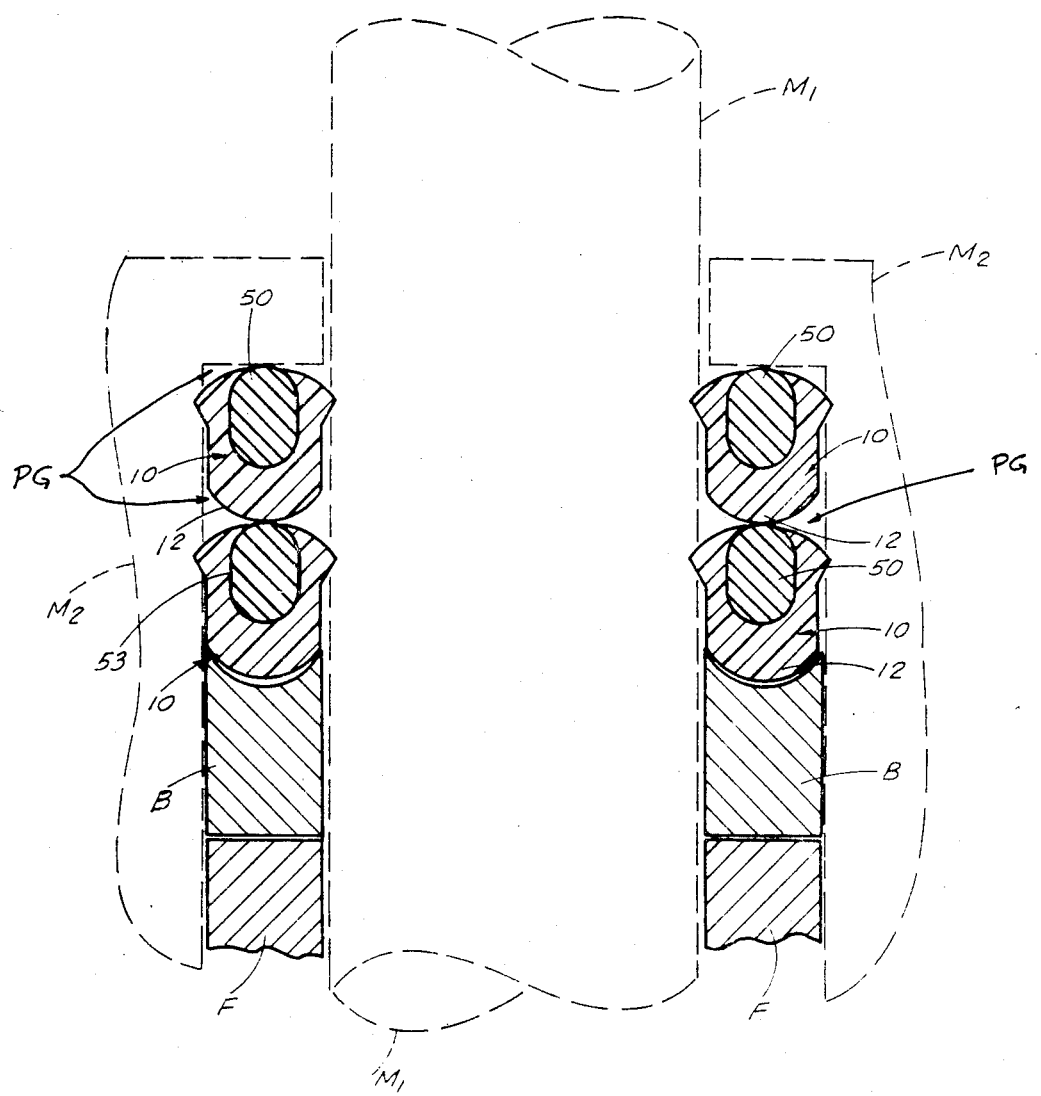
FIG. 5 is a schematic sectional view of the preferred embodiment of the apparatus of the present invention shown in an exemplary use as a seal around a valve stem.
Figure 5A:
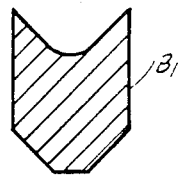
FIGS. 5A, 5B, and 5C are sectional views respectively of various backup members used in conjunction with the preferred embodiment of the apparatus of the present invention.
Figure 5B:
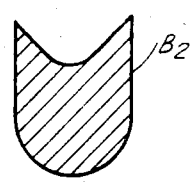
Figure 5C:
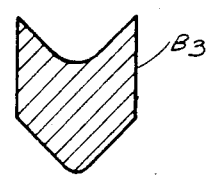

FIG. 5A, 5B and 5C show other different exemplary types of backup configurations B1, B2 and B3. The backup configurations of FIGS. 5A-5C would adapt seal 10 to an existing packing gland PG and match the gland configuration. Typical backup materials would be for example peek or alloyed peek, Teflon or alloyed Teflon, and Ryton or alloyed Ryton. Other suitable plastic, thermoplastic, and soft metals may be used. Soft metal backup rings are particularly useful as a secondary seal in situations where a fire-safe design is required. In certain harsh chemical environments, where no elastomeric resilient expander compounds are suitable for the intended service, the expander 50 can be encapsulated with a non-permeable plastic or thermoplastic (FIG. 5) layer 53 of material such as Teflon.

In FIG. 5, an exemplary installation is shown for an internal moving member $M_1$ such as a valve stem, pump plunger or any other sliding or rotating member. A packing glad PG contains follower F, backup B and two stacked annular seals 10. A static member $M_2$ in FIG. 5 could be for example a valve housing, pump housing or the like.

Figure 6B:
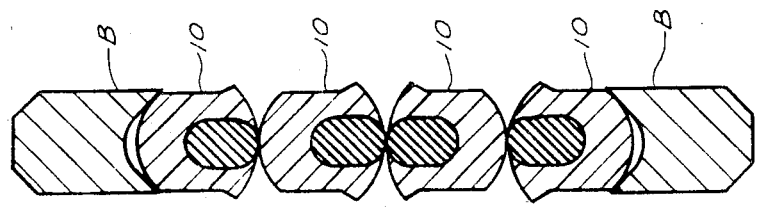
FIGS. 6, 6A, and 6B are sectional schematic illustrations of the preferred embodiment of the apparatus of the present invention used in combination with a gas lift valve.
Figure 6A:
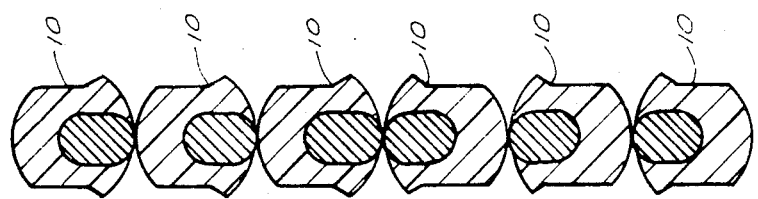
Figure 6:
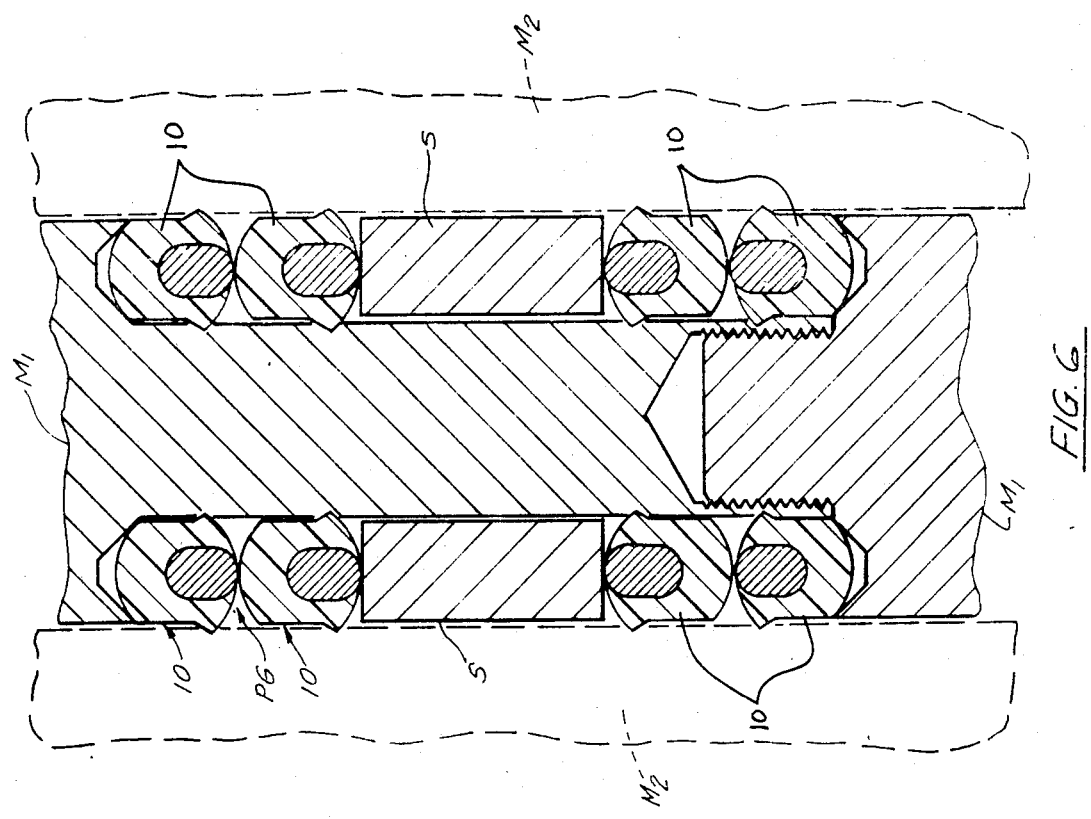

FIG. 6 shows multiple seals 10 in a typical gas lift type application or any other type of downhole oil or gas well tool that goes into a pocket. FIG. 6 shows two (2) seals 10 opposing each other with a spacer "S" between them. In such a service the seal body 12 could be made of Hytrel and the expander 50 would be made of Nitrile for example. The spacers would normally be Teflon for example. Other suitable plastic, thermoplastic, and elastomeric materials may be used. The seals 10 are disposed in a packing gland PG is defined as the space between an inner member M, which is the gas lift valve and an outer member $M_2$ which is a mandrel that carries the valve $M_1$. FIG. 6A shows a mother configuration for the gas lift well or the like application of FIG. 6 with three (3) seals 10 facing each other. The material for body 12 could be either Hytrel or alloyed Teflon. Three (3) seals 10 facing each other (FIG. 6A) is normally used where pockets may be washed out and there is a need for extra sealing capability of the multiple lips. FIG. 6B shows two (2) seals 10 facing each direction with a backup B configuration. This configuration (FIG. 6B) would normally be reserved for higher pressure, higher temperature, and harsh chemical environments. In such cases, body 12 would be manufactured of an alloyed Teflon, expander 50 would generally be Viton, and the backup B would normally be a carbon filled peek blend. Other suitable plastic, thermoplastic, and elastomeric materials may be used.

Figure 7:
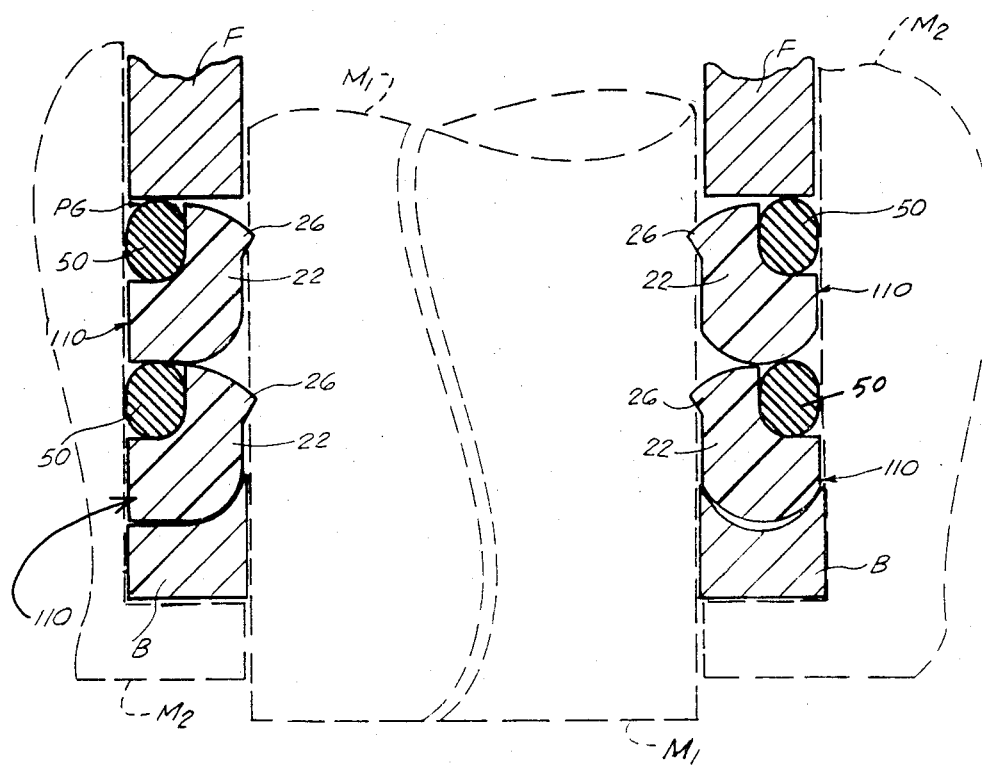
FIG. 7 is another schematic sectional elevational view of an alternate embodiment of the apparatus of the present invention.

FIG. 7 shows the configuration of a single lip 22 seal 110 that it is used to seal on an internal diameter side of the seal 110. "B" and "B1" in FIG. 7 show different alternate backup configurations for purposes of illustration. The seal body 12 and the backup 6 could be made with either of the cross sectional configurations illustrated in FIG. 7. This seal 110 could be used for plunger pump type applications, chemical injection pumps, valve stems, and other devices where a shaft or such moving member M, moves up and down for example. An outer member $M_2$ such as a pump or valve housing provides a packing gland PG.

Figures 8, 8A:
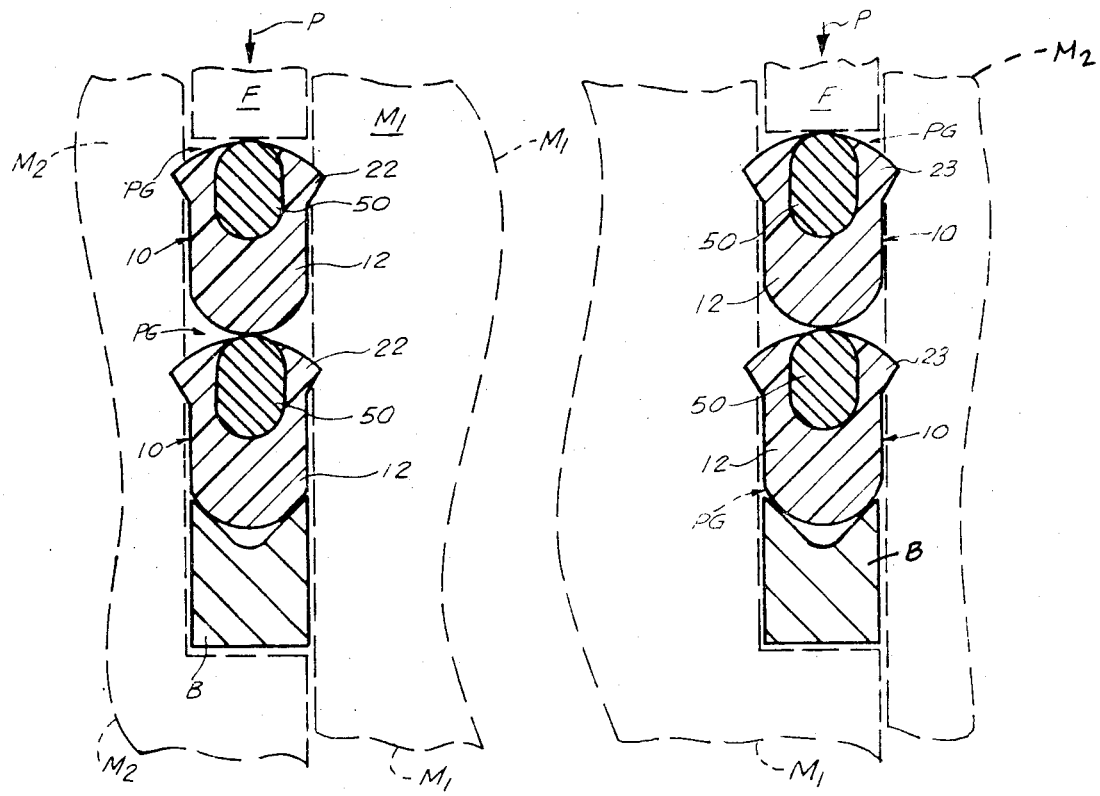
FIGS. 8 and 8A illustrate the preferred embodiment of the apparatus of the present invention during use.
Figure 9:
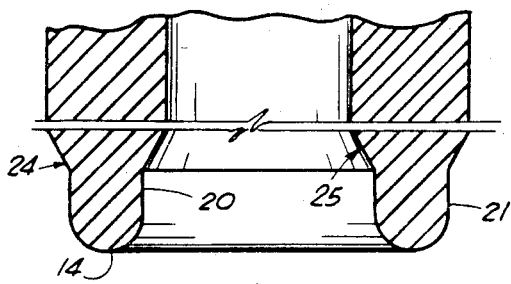
FIGS. 9, 10, 11, 12A and 12B are sequential views illustrating the method of manufacture of the preferred embodiment of the apparatus of the present invention.

FIG. 8 shows a typical configuration of seal 10 that is sealing on the internal diameter (I.D.) lip 22. FIG. 8A shows a typical configuration sealing on the outer diameter (O.D.) lip 23. In each exemplary view of FIG. 8 and 8A the packing glands PG are defined by members $M_1$, $M_2$. Followers F and backups B are shown and arrows P indicate the direction of pressure loading.

Figure 12A:
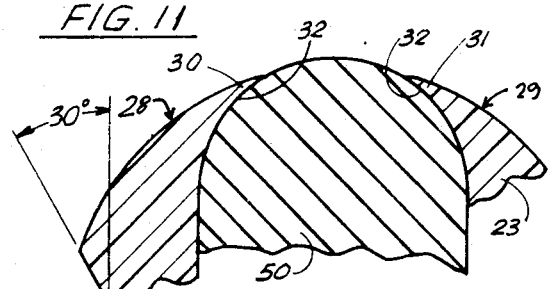
Figure 12B:
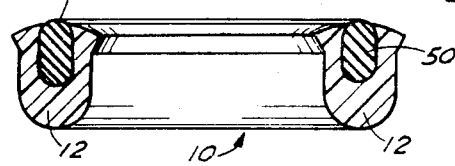

FIGS. 9, 10, 11, 12A and 12B illustrate the sequential steps and process of manufacture of the seal 10, with plastic or thermoplastic materials that are not compression or injection moldable. A forming tool in FIG. 9 first cuts the heal 14, side walls 20, 21 and bevels the lip surfaces 24, 25 of body 12. The body 12 is then parted with a parting tool to the correct height dimension. FIG. 10 shows seal body 12 after cutting the expander groove 40 with the expander 50 positioned outside the groove 40 prior to insertion into the groove 40. FIG. 11 shows expander 50 installed in groove 40. FIGS. 12A and 12B show the expander 50 captured after the seal lips 30, 31 have been rolled with a forming tool to "capture" the expander 50. FIG. 12A illustrates the geometric configuration of lips 22, 23 and more particularly the outer curved surface portions 28, 29 thereof and the relationship with expander 50. Note that expander 50 and surfaces 28, 29 define generally a constant continuous curvature. This curvature radius is preferably sixty (60%) percent of the heal 14 width. For example, if heel 14 is one-half inch, the curvature of surfaces 28, 29 and expander 50 would be a radius of curvature of 0.3 inches.

Figure 13:
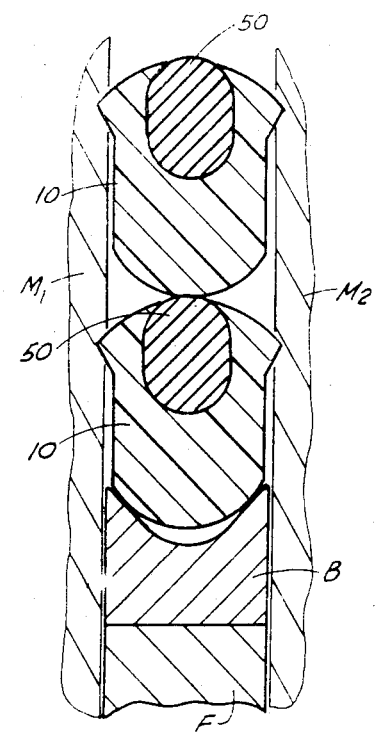
FIG. 13 is a schematic illustration of the preferred embodiment of the apparatus of the present invention shown in position in the packing gland prior to loading.

FIG. 13 shows the seal in a typical configuration for any equipment application. The object here is to show the free state of the seal 10 with respect to the packing gland PG.

Figure 14:
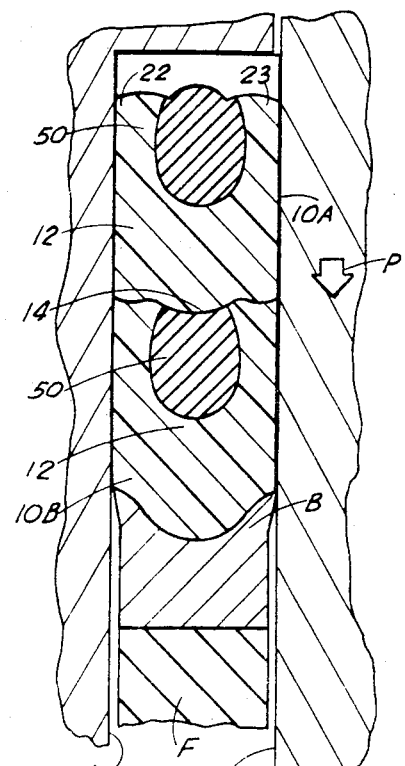
FIG. 14 is a sectional view of the preferred embodiment of the apparatus of the present invention showing the seal under pressure.

FIG. 14 shows deformed seals 10 after being subjected to pressure loading. The lips 22, 23 on the upper seal roll in causing the expander 50 to move against wall W1 or W2 and form a straight line up and down the wall W1 or W2 as shown. The heel 14 of (upper) seal 10A then loads the expander 50 in the second (lower) seal 10B in the stack of FIG. 14. This shows the typical loaded configuration of the seal with the backup "B" lips flared against the wall to give essentially a zero clearance gap. FIGS. 5, 7, 8, 8A, 13 and 14 show the seal in a stacked configuration. However, single usage may be suitable in certain applications.

I claim:

1. An annular lip type sealing ring apparatus comprising:
  a. an annular body with U-shaped cross-section having a heel portion and two spaced apart lip portions that define a groove therebetween, the groove terminating at a closed end portion near the heel and at an opposite open end portion;
  b. each lip portion having an outer free end with an outer arcuate curved surface;
  c. at least one of the lip portions having respective inwardly and outwardly extending lateral projections;
  d. the inwardly extending lateral projection including an inner curved surface;
  e. means for preloading the lips with a load that biases the lips to spread apart prior to installation of the sealing ring in a packing space, comprising an elastomeric annular ring having a generally round cross-section before insertion into the groove and a cross-sectional diameter greater than the width of the groove so that the elastomeric annular ring defines an interference fit with the annular body when it is placed in the groove.

2. The sealing ring of claim 1 wherein the groove is an oblong shape in cross-section.

3. The sealing ring of claim 1 wherein the heel is generally semi-circular in section.

4. The sealing ring of claim 1 wherein the center of the groove in section is positioned between the outwardly extending lateral projections of the lips and the heel of the body.

5. The sealing ring of claim 1 wherein the lips are correspondingly shaped.

6. The sealing ring of claim 1 wherein each lip includes inwardly and outwardly extending lateral projections.

7. The sealing ring of claim 1 wherein the groove includes a pair of semi-circular cross sectional end portions communicating with the open portion of the groove.

8. The sealing ring of claim 1 wherein the groove is defined by a cross section of two spaced apart circular end portions of equal diameter that are connected by a rectangular section having a width equal to the diameter of the circular end portions.

9. An annular lip type sealing ring apparatus comprising:
   a. an annular body with U-shaped cross-section having a curved heel portion and two spaced apart lip portions that define a groove therebetween, the groove terminating at a closed end portion near the heel and at an opposite open end portion;
   b. each lip portion having an outer free end with an outer arcuate curved surface;
   c. at least one of the lip portions having respective inwardly and outwardly extending lateral projections;
   d. the inwardly extending lateral projection including an inner curved surface;
   e. means for preloading the lips with a load that biases the lips to spread apart, comprising an elastomeric annular ring having a generally round cross-section before insertion into the groove and a cross-sectional diameter greater than the width of the groove so that the annular ring defines an interference fit with the annular body; and
   f. wherein the lip outer end portions and the elastomeric annular ring define in combination an arcuate side of the annular sealing ring that facilitates insertion of the ring into a packing gland.

10. The sealing ring of claim 9 wherein the elastomeric annular ring is circular in cross section.

11. An annular lip type sealing ring apparatus comprising:
   a. an annular body with U-shaped cross-section having a curved heel portion and two spaced apart lip portions that define a groove therebetween, the groove terminating at a closed end portion near the heel and at an opposite open end portion;
   b. each lip portion having an outer free end with an outer arcuate curved surface;
   c. at least one of the lip portions having respective inwardly and outwardly extending lateral projections;
   d. the inwardly extending lateral projection including an inner curved surface;
   e. means for preloading the lips with a load that biases the lips to spread apart, comprising an elastomeric annular ring having a generally round cross-section before insertion into the groove and a cross-sectional diameter greater than the width of the groove so that the annular ring defines an interference fit with the annular body; and
   f. wherein the elastomeric annular ring is encapsulated with a nonpermeable plastic layer of material.

12. The sealing ring of claim 11 wherein the plastic is thermoplastic.

13. An annular lip type sealing ring apparatus comprising:
   a. an annular body with a generally U-shaped cross-section having a heel portion and two spaced apart lip portions that define an oblong groove therebetween, the groove terminating at a closed end portion near the heel and at an opposite open end portion;
   b. the lip portions having respective outer free ends with external surfaces that extend laterally away from the open end portion of the groove and towards the heel;
   c. at least one of the lip portions having respective inwardly and outwardly extending lateral projections;
   d. means occupying the groove during use for preloading the lips with a load that biases the lips to spread apart prior to installation of the sealing ring in a packing space and comprising an elastomeric annular ring having a generally rounded cross-section prior to insertion in the groove and a cross-sectional diameter greater than the width of the groove so that the elastomeric annular ring forms and interference fit with the annular body when the elastomeric annular ring is placed in the groove.

14. The sealing ring of claim 13 wherein the elastomeric annular ring has a round cross-section.

15. The sealing ring of claim 13, wherein the lip outer free ends have curved external surfaces.

16. The sealing ring of claim 15, wherein the heel portion and the free ends of the lip portions are curved in cross-section.

* * * * *